United States Patent [19]

Saito et al.

[11] Patent Number: 5,319,016

[45] Date of Patent: Jun. 7, 1994

[54] EMULSION ADHESIVE COMPOSITION AND PROCESS FOR PRODUCTION THEREOF

[75] Inventors: Jun Saito; Toshimori Nakai; Sinzi Chiku; Takanobu Kawamura, all of Chiba; Kazuo Ito, Aichi; Yoshiro Umemoto, both of Aichi, all of Japan

[73] Assignee: Chisso Corporation, Osaka, Japan

[21] Appl. No.: 22,854

[22] Filed: Feb. 25, 1993

Related U.S. Application Data

[63] Continuation of Ser. No. 798,830, Nov. 22, 1991, abandoned, which is a continuation of Ser. No. 543,554, Jun. 26, 1990, abandoned.

[30] Foreign Application Priority Data

Jul. 4, 1989 [JP] Japan ................ 1-171244
Jul. 4, 1989 [JP] Japan ................ 1-171245

[51] Int. Cl.$^5$ ............................................. C09J 123/28
[52] U.S. Cl. ...................................... 524/504; 524/505
[58] Field of Search .................................. 524/504, 505

[56]   References Cited

U.S. PATENT DOCUMENTS

| | | | |
|---|---|---|---|
| 3,775,227 | 11/1973 | Wilbert et al. | 524/528 |
| 4,174,335 | 11/1979 | Ohdaira et al. | 524/504 |
| 4,199,490 | 4/1980 | Kamiya et al. | 524/505 |
| 4,452,950 | 6/1984 | Wideman | 525/338 |
| 4,476,180 | 10/1984 | Wnuk | 524/524 |
| 4,619,969 | 10/1986 | Doi et al. | 525/93 |
| 4,740,427 | 4/1988 | Ochiumi et al. | 525/80 |
| 4,863,988 | 9/1988 | Inagaki et al. | 524/504 |

OTHER PUBLICATIONS

*The Condensed Chemical Dictionary,* by Gessner G. Hawley, Van Nostrand Reinhold Co., New York, 1981, p. 17.
Skeist, I., *Handbook of Adhesives,* Third Edition, Van Nostrand Reinhold, ©1990, 1977, 1962, pp. 255-256.

*Primary Examiner*—Joseph L. Schofer
*Assistant Examiner*—R. H. Delmendo
*Attorney, Agent, or Firm*—Leydig Voit & Mayer

[57]   ABSTRACT

An emulsion adhesive composition is provided which comprises: (i) an aqueous elmusion of a adhesive synthetic resin and (ii) a solution of an organic solvent and a polyolefin and/or a hydrogenated block copolymer composed of an aromatic vinyl compound and an aliphatic diene polymer blocks, and each of the polyolefin and the hydrogenated block copolymer contains at least one functional group selected from carboxylic anhydride carboxyl, glycidyl, hydroxyl, amido and alkoxysilyl groups. A photostabilizer may be incorporated into the composition in which said component (ii) may contain chloro.

The emulsion adhesive composition can be used for adhering a highly crystalline resin molded article to an optional material without a complicated surface treatment, and can have a light resistance and storing stability.

17 Claims, No Drawings

EMULSION ADHESIVE COMPOSITION AND PROCESS FOR PRODUCTION THEREOF

This application is a continuation of application Ser. No. 07/798,830, filed Nov. 22, 1991; which is a continuation of application of application Ser. No. 07/543,554, filed Jun. 26, 1990, both abandoned.

BACKGROUND OF THE INVENTION

1. Field of the Invention

This invention relates to an adhesive composition and a process for producing the adhesive composition, and more particularly, to an emulsion adhesive composition or a light resistant, emulsion adhesive composition suitable for adhering molded articles formed from highly crystalline resin such as polyolefin, nylon and the like to an optional material and a process for the production thereof.

2. Description of Related Art

Materials for motorcar parts and domestic electrical appliances have been recently made of plastics because of economy and light weight to a great extent. In particular, highly crystalline resins, for example, polyolefins such as polypropylene, polyethylene and the like and nylons are preferably used as the plastics.

However, since polyolefins and nylons are highly crystalline, when they are used in the form of a molded article, it is necessary to impart to them an adhesion property, before adhering, by treating the surface of the article with plasma or by applying a primer to the surface.

Indeed such treatments can render highly crystalline resin molded articles adhesive, but a complicated surface treating procedure is required and therefore, such treatments are very disadvantageous from the standpoint of commercial production.

The present inventors have intensively investigated adhesives capable of adhering molded articles of highly crystalline resins such as polyolefins and nylons with each other or with other materials such as optional materials without complicated surface treatments. As a result, the present inventors have found that the adhesive strength between highly crystalline resin molded articles such as polyolefins and nylons and an optional material when they are adhered, can be enhanced remarkably by using an adhesive composition produced by adding and mixing, under particular conditions, a conventional aqueous emulsion adhesive with a functional group-containing polyolefin and/or a block copolymer hydrogenated product composed of at least one aromatic vinyl compound polymer block and at least one aliphatic diene polymer block. Thus, the present invention has been completed.

Further, in connection with the above mentioned problems, some of the present inventors have already proposed in Japanese Patent Application Nos. 312592/1987 and 313634/1987 (hereinafter referred to as "inventions of prior applications") that a specified chlorinated polyolefin is added to a conventional aqueous emulsion adhesive and the resulting adhesive can markedly improve the adhesive strength when a molded article of a highly crystalline resin such as polyolefins and nylons is adhered to an optional material.

By using such adhesives proposed by the inventions of prior applications, molded articles of highly crystalline resins can be adhered to an optional material, but the light resistance to the sun light is poor depending upon the type of the materials to be adhered and circumstances where the molded articles thus adhered are used.

The present inventors have intensively researched so as to prepare an adhesive capable of solving the above mentioned problem. As a result, the present inventors have found that the light resistance can be enhanced by adding a photostabilizer to the adhesive of inventions of prior applications and the light resistance can be further enhanced and the storing stability can be improved by using a polyolefin containing chlorine and grafted with a monomer capable of radical polymerization in place of the chlorinated polyolefin, and further the introduction of specified functional groups in place of chlorine still gives the adhesion characteristics similar to those of the chlorinated polyolefin. Thus another aspect of the present invention has been completed.

SUMMARY OF THE INVENTION

One object of the present invention is to provide an emulsion adhesive composition capable of adhering a molded article in a solid state of a highly crystalline resin to an optional material without a complicated surface treatment.

Another object of the present invention is to provide an emulsion adhesive composition capable of adhering a molded article in a solid state of a highly crystalline resin to an optional material without a complicated surface treatment and exhibiting excellent light resistance, or exhibiting excellent light resistance and storing stability.

A further object of the present invention is to provide processes for producing the above mentioned emulsion adhesive compositions.

According to one aspect of the present invention, there is provided an emulsion adhesive composition which comprises a resin component comprising (i) an aqueous emulsion containing 100 parts by weight of an adhesive synthetic resin resulting from emulsion polymerization of one or more vinyl monomers, and (ii) a solution containing an organic solvent and 0.05–40 parts by weight of at least one of (a) a polyolefin containing 0.01–20% by weight of at least one functional group selected from the group consisting of carboxylic anhydride group, carboxyl group, glycidyl group, hydroxyl group, amido group, and alkoxysilyl group, and (b) a hydrogenated block copolymer containing 0.01–20% by weight of at least one functional group selected from the functional groups, composed of at least one aromatic vinyl compound polymer block and at least one aliphatic diene polymer block.

According to another aspect of the present invention, there is provided an emulsion adhesive composition which comprises a resin component comprising (i) an aqueous emulsion containing 100 parts by weight of an adhesive synthetic resin resulting from emulsion polymerization of one or more vinyl monomers;

(ii) a solution of an organic solvent and 0.05–40 parts by weight of at least one of (a) a polyolefin containing 0.01–20% by weight of at least one functional group selected from the group consisting of carboxylic anhydride group, carboxyl group, glycidyl group, hydroxyl group, amido group, and alkoxysilyl group, or 0.01–70% by weight of the combination of a chloro group and at least one member selected from the group consisting of said functional groups, and (b) a hydrogenated block copolymer containing 0.01–70% by weight of at least one member selected from the group consisting of a chloro group and the functional groups, composed of at least one aromatic vinyl compound polymer block and at least one aliphatic diene polymer block; and (iii) 0.1–20 parts by weight of a photostabilizer based on 100 parts by weight of the total amount of (i) and (ii) above.

According to a further aspect of the present invention, there is provided a process for producing an emulsion adhesive composition which comprises adding, to (A) an aqueous emulsion of an adhesive synthetic resin containing 100 parts by weight of the synthetic resin, (B) a solution composed of (i) 0.05–40 parts by weight of at least one of (a) a polyolefin containing 0.01–20% by weight of at least one functional group selected from the group consisting of carboxylic anhydride group, carboxyl group, glycidyl group, hydroxyl group, amido group, and alkoxysilyl group, and (b) hydrogenated block copolymer containing 0.01–20% by weight of at least one functional group selected from said functional groups, composed of at least one aromatic vinyl compound polymer block and at least one aliphatic diene polymer block and (ii) an organic solvent.

According to still another aspect of the present invention, there is provided a process for producing an emulsion adhesive composition which comprises adding, to (A)

(i) an aqueous emulsion of an adhesive synthetic resin containing 100 parts by weight of the synthetic resin, (B) a solution composed of (ii) 0.05–40 parts by weight of at least one of (a) a polyolefin containing 0.01–20% by weight of at least one functional group selected from the group consisting of carboxylic anhydride group, carboxyl group, glycidyl group, hydroxyl group, amido group, and alkoxysilyl group, or 0.01–70% by weight of the total of chloro and at least one member selected from the group consisting of said functional groups, and (b) a hydrogenated block copolymer containing 0.01–70% by weight of at least one member selected from the group consisting of chloro and said functional groups, composed of at least one aromatic vinyl compound polymer block and at least one aliphatic diene polymer block, (iii) 0.1–20 parts by weight of a photostabilizer based on 100 parts by weight of the total amount of (i) and (ii) above, and (iv) an organic solvent.

DESCRIPTION OF THE PREFERRED EMBODIMENTS

According to the first aspect of the present invention, the emulsion adhesive composition contains a resin component comprises of:

(i) 100 parts by weight of an adhesive synthetic resin, and (ii) 0.05–40 parts by weight of a polyolefin and/or a hydrogenated block copolymer.

The polyolefin in (ii) above contains 0.01–20% by weight of at least one functional group selected from the group consisting of carboxylic anhydride group, carboxyl group, glycidyl group, hydroxyl group, amido group and alkoxysilyl group.

The hydrogenated block copolymer in (ii) above contains 0.01–20% by weight of at least one functional group selected from the aforementioned groups and is composed of at least one aromatic vinyl compound polymer block and at least one aliphatic diene polymer block.

The component (ii) may be the polyolefin alone, or the hydrogenated block copolymer alone, or a combination of the polyolefin and the hydrogenated block copolymer.

As the aqueous emulsion of adhesive synthetic resin in the present invention, there may be used any aqueous emulsion of adhesive synthetic resins produced by known methods. For example, one or more of polymerizable vinyl monomers are subjected to an emulsion polymerization using a polymerization intiator in the presence of an emulsifier, if desired, in the presence of additives such as a molecular weight adjusting agent, a water soluble high polymer compound or an inorganic compound or the like, in general, at 30°–90° C. under atmospheric pressure to 50 kg/cm$^2$G for 1–20 hours and thereby an aqueous emulsion of adhesive synthetic resin is obtained.

The term polymerizable vinyl monomer means a compound having at least one unsaturated bond capable of radical polymerization or copolymerization in the molecule.

Examples of polymerizable vinyl monomers include acrylic acid, acrylic acid esters such as methyl acrylate, ethyl acrylate, butyl acrylate, hexyl acrylate, 2-ethylhexyl acrylate, heptyl acrylate, octyl acrylate and the like, methacrylic acid, methacrylic acid esters such as methyl methacrylate, ethyl methacrylate, butyl methacrylate, diethylaminoethyl methacrylate, glycidyl methacrylate, 2-hydroxyethyl methacrylate and the like, aromatic type monomers such as styrene, α-methylstyrene, vinyltoluene, hydroxystyrene and the like, dienes such as 1,3-butadiene, isoprene, chloroprene, 1,5-hexadiene and the like, maleic acid, maleic acid esters such as diethyl maleate, di-n-butyl maleate, and the like, fumaric acid, fumaric acid esters such as diethyl fumarate, di-n-butyl fumarate, and the like, acrylonitrile, methacrylonitrile, acrylamide, N-methylolacrylamide, methacrylamide, vinyl chloride, vinylidene chloride, vinyl acetate, copolymerizable ethylene and the like. These monomers can be used alone or in combination.

Examples of the polymerization initiator include organic peroxides such as cumene hydroperoxide, t-butyl hydroperoxide and the like, hydrogen peroxide, 2,2-azobisisobutyronitrile, persulfates such as ammonium persulfate, potassium persulfate and the like, and combinations of these compounds with reducing agents such as sodium thiosulfate, ferrous chloride and the like.

Examples of the emulsifier include anionic surfactants such as aliphatic acid salts, higher alcohol sulfuric acid esters and the like, and nonionic surfactants such as polyoxyethylene alkyl ethers, polyoxyethylene alkyl phenol ethers, polyoxyethylene alkyl esters, sorbitan alkyl esters and the like.

The thus-obtained aqueous emulsion which has been polymerized can be directly used as an aqueous emulsion of adhesive synthetic resin, but the viscosity may be adjusted with aqueous ammonia or the like and, if desired, there may be further added synthetic resins, fillers, crosslinking agents, antiseptics and the like.

In the present invention, an aqueous emulsion of adhesive synthetic resin prepared as above can be used, but it is also possible to use directly a commercially available aqueous emulsion adhesive. In such a case, there are various types depending on the vinyl monomer species employed, but it is advisable to select an optimum one suitable for an optional material to which the highly crystalline resin molded article is to be adhered.

There are preferably used, for example, acryl type aqueous emulsion adhesives which comprise acrylic acid esters as the main vinyl monomer, vinyl acetate type aqueous emulsion adhesives which comprise vinyl acetate as the main vinyl monomer, and styrene type aqueous emulsion adhesives which comprise styrene as the main vinyl monomer.

The second resin component of the emulsion adhesive composition of the present invention is a polyolefin containing from 0.01 to 20% by weight of at least one functional group selected from the group consisting of carboxylic anhydride group, carboxyl group, glycidyl group, hydroxyl group, amido group and alkoxysilyl group, and/or a hydrogenated block copolymer containing from 0.01 to 20% by weight of at least one of the functional groups and comprising at least one aromatic vinyl compound polymer block and at least one aliphatic diene polymer block (hereinafter sometimes referred to as "functional group containing polyolefin etc.").

This second resin component may be prepared by introducing the above-mentioned functional group to a polyolefin and/or a hydrogenated block copolymer comprising at least one aromatic vinyl compound polymer block and at least one aliphatic diene polymer block (hereinafter sometimes referred to as "polyolefin etc.") which can be produced by known methods.

The functional group can be introduced into polyolefin etc. by various methods. It is an easy method that a vinyl monomer having the functional group is grafted onto a polyolefin etc. That is, a vinyl monomer having the above mentioned functional group is added to a solution of polyolefin etc. in an organic solvent, an aqueous suspension of polyolefin etc., a gas phase containing polyolefin etc. in the presence of a radical initiator, or if necessary, in the presence of a chain transfer agent followed by effecting a graft polymerization at 30°–200° C., or polyolefin etc., a radical initiator, and a vinyl monomer having the above-mentioned functional group are fed to an extruder to carry out the graft polymerization, or other known methods can be used for the introduction.

It is desired that the content of the functional group in functional group-containing polyolefin etc. is 0.01–20% by weight. When the content of the functional group is outside the above mentioned range, the adhesive strength of the resulting adhesive composition becomes insufficient.

Polyolefin etc. used for preparing the above-mentioned functional group-containing polyolefin etc. used in the present invention may be the following materials: polyolefin regardless of stereoregularity produced by known methods such as polypropylene, propylene-α-olefin copolymer, polyethylene, ethylene-α-olefin copolymer, poly 4-methylpentene 1,4-methylpentene-1-α-olefin copolymer and the like; hydrogenated block copolymers produced by known methods, containing at least one aromatic vinyl compound polymer block such as styrene, α-methylstyrene and the like and at least one aliphatic diene polymer block such as butadiene, isoprene, and the like. These are particularly hydrogenated block copolymers of styrene and butadiene, hydrogenated block copolymers of styrene and isoprene, hydrogenated block copolymers of styrene, butadiene and styrene, and the like.

α-Olefins capable of copolymerizing with propylene and the like include ethylene, propylene, 4-methylpentene-1, and further, straight chain olefins such as butene-1, hexene-1, octene-1 and the like, branched olefins such as 2-methylpentene-1 and the like, and dienes such as butadiene, isoprene and the like.

Among the above-mentioned polyolefin etc., there are preferably used polyolefins, styrene-butadiene-styrene block copolymer hydrogenated products, and styrene-isoprene block copolymer hydrogenated products.

From the standpoints of adhesion, weatherability and heat resistance, polyolefins having intrinsic viscosity $[\eta]$ (measured in tetralin at 135° C.; measurement in the following is also made under the same conditions as above) of 0.1 dl/g–10 dl/g are preferably used. These polyolefins may be used alone or in combination.

As described above, the functional group-containing polyolefin etc. can be obtained by grafting a vinyl monomer having a functional group or the above-mentioned polyolefin etc.

As the vinyl monomer having a functional group used for preparing the functional group-containing polyolefin etc., there may be mentioned vinyl monomers capable of graft polymerization having at least one of functional groups such as carboxylic anhydride group, carboxyl group, glycidyl group, hydroxyl group, amido group, alkoxysilyl group and the like.

Exemplary suitable vinyl monomers include vinyl monomers containing a carboxylic anhydride group such as maleic anhydride, itaconic anhydride, citraconic anhydride, allylsuccinic anhydride, glutaconic anhydride. Nadic anhydride, methyl Nadic anhydride, tetrahydrophthalic anhydride, methyltetrahydrophthalic anhydride and the like; vinyl monomers containing a carboxyl group such as acrylic acid, methacrylic acid, crotonic acid, maleic acid, fumaric acid, itaconic acid, citraconic acid, allylsuccinic acid, glutaconic acid, Nadic acid, methyl Nadic acid, tetrahydrophthalic acid, methyltetrahydrophthalic acid and the like; vinyl monomers containing a glycidyl group such as glycidyl acrylate, glycidyl methacrylate, methylglycidyl acrylate, methylglycidyl methacrylate, allyl glycidyl ether and the like; vinyl monomers containing a hydroxyl group such as 2-hydroxyethyl acrylate, 2-hydroxyethyl methacrylate, hydroxypropyl acrylate, hydroxypropyl methacrylate and the like; vinyl monomers containing an amido group such as acrylamide, N-methylol acrylamide, N-butoxymethyl acrylamide and the like; and vinyl monomers containing an alkoxy group such as vinyl trimethoxy silane, vinyl triethoxy silane, vinyl dimethyl ethoxy silane, vinyl triacetoxy silane, vinyl methyl diacetoxy silane, allyl trimethoxy silane, allyl triethoxy silane, τ-methacryloxy trimethoxy silane, τ-methacryloxypropyl trimethoxy silane, τ-methacryloxypropyl methyl dimethoxy silane, τ-acryloxypropyl trimethoxy silane, τ-acryloxypropyl methyl dimethoxy silane and the like. These vinyl monomers may be used alone or in combination.

Further, the vinyl monomers having such functional group may be used together with other monomers such as styrene, acrylonitrile, acrylic acid ester, methacrylic acid ester, vinyl acetate and the like in such an amount that the various characteristics of the adhesive composition of the present invention are not adversely affected. These monomers capable of being used jointly may be used simultaneously with the monomer having a functional group to effect graft copolymerization, or may be grafted onto polyolefin etc. in the presence of a radical initiator before or after the monomer having a functional group is grafted thereonto.

As radical initiators used for preparing functional group-containing polyolefin etc., there may be mentioned those used for preparing the above-described adhesive synthetic resin emulsion and, in particular, organic peroxides are preferable.

Exemplary suitable organic peroxides include benzoyl peroxide, dicumyl peroxide, di-t-butyl peroxide, lauroyl peroxide, 2,5-dimethyl-2,5-di(t-butylperoxy)-hexyne-3,2,5-dimethyl-2,5-di(t-butylperoxy)hexane and the like.

The second resin component of the emulsion adhesive composition according to the present invention. i.e. functional group-containing polyolefin etc. can be prepared as shown above.

However, in order to further enhance the adhesive strength, a preferable embodiment is one in which the functional group-containing polyolefin etc. contains 70% by weight or less of chlorine in addition to the functional group. When the content of chlorine exceeds 70% by weight, the adhesive strength is inversely lowered. Introduction of chlorine may be effected before or after the graft polymerization for introducing the functional group into the polyolefin etc., or simultaneously with said graft polymerization. Chlorine may be introduced by the following known methods. That is, chlorine gas is added to polyolefin etc. or functional group containing polyolefin etc., dissolved in a solvent such as tetrachloroethane and the like, suspended in an aqueous suspension, or in a gas phase at a reaction temperature 30°-120° C. at atmospheric pressure to 10 kg/cm$^2$G, and if desired, in combination with a means for enhancing the reaction efficiency such as using a radical initiator, irradiation with ultraviolet ray and the like, and the chlorinating reaction is carried out usually for 1-10 hours.

When the chlorinating reaction is carried out before the functional group is introduced into polyolefin etc., the functional group can be introduced by using, in place of a vinyl monomer containing the functional group, a compound having an active group capable of reacting with a chloro group such as a mercapto group, amino group and the like and the above mentioned functional group, for example, τ-mercaptopropyl trimethoxy silane, τ-aminopropyl triethoxy silane and the like, and carrying out the reaction in the presence of an acid acceptor and a radical initiator.

The emulsion adhesive composition of the present invention needs the above mentioned two components as the synthetic resin component, and the ratio of amounts thereof is 0.05-40 parts by weight of the functional group-containing polyolefin etc. to 100 parts by weight of the adhesive synthetic resin component. When the ratio of amounts of the two components is outside the above mentioned range, the adhesive strength of the resulting adhesive composition is lowered.

The emulsion adhesive composition of the present invention is an aqueous emulsion essentially comprising the above-mentioned synthetic resin components in the amount ratio, and may be produced by the following process.

To the above-mentioned (A) an aqueous emulsion of the adhesive synthetic resin is added (B) a solution composed of (1) functional group containing polyolefin etc. and (3) an organic solvent. When an organic solvent is not used, the adhesive strength of the resulting adhesive is insufficient. The amount of the organic solvent used is not particularly limited as far as the functional group containing polyolefin etc. can be sufficiently dissolved therein, but is usually 2-30 times the amount of the functional group-containing polyolefin etc.

The organic solvent usable in the invention may be any one in which the above mentioned functional group-containing polyolefin etc. can be dissolved therein. The examples include aromatic hydrocarbons such as toluene, xylene and the like, chlorinated hydrocarbons such as trichloroethylene, dichloroethane, trichloroethane and the like, aliphatic hydrocarbon such as heptane, octane, decane and the like, ketones and esters. These can be used alone or in combination.

To the above mentioned solution, a synthetic resin such as petroleum resin, amino resin and the like may be added in an amount which does not adversely affect the characteristics of the adhesive composition of the present invention, and further an aqueous solution of a surfactant may be added thereto and mixed therewith, and then the resulting solution may be added to the aqueous emulsion of the adhesive synthetic resin.

When a commercially available aqueous emulsion adhesive is used as an aqueous emulsion of the adhesive synthetic resin and the above-mentioned solution is added thereto, sometimes the resulting adhesive composition becomes a paste. This can be avoided by previously adding water to the commercially available aqueous emulsion adhesive and as a result the emulsion state can be stably maintained even after adding the above-mentioned solution.

In this manner, the emulsion adhesive composition of the present invention can be obtained. From the standpoint of handling, it is preferably that the concentration of the resin component in the adhesive composition is about 10%-65% by weight and the viscosity is about 100 cps-30,000 cps.

When a relatively large amount of organic solvent is used in the process of the preparation, a desired amount of the organic solvent may be removed by distilling the resulting emulsion under reduced pressure at a temperature range of from room temperature to about 80° C.

The emulsion adhesive composition of the present invention thus prepared can be used for adhering highly crystalline resin molded articles, such as polyolefin, nylon and the like to each other and, adhesion for surface decoration, such as pile planting processing of said molded articles. The adhesion procedure may be the same as known procedures employed for conventional aqueous emulsion adhesive.

According to another aspect of the present invention the emulsion adhesive composition contains a resin component comprised of:
  (i) 100 parts by weight of an adhesive synthetic resin, and
  (ii) 0.05-40 parts by weight of a polyolefin and/or a hydrogenated block copolymer; and
  (iii) 0.01-20 parts by weight of a photostabilizer (per 100 parts by weight of the total amount of (i) and (ii) above). The polyolefin in (ii) above contains 0.01-20% by weight of at least one functional group selected from the group consisting of carboxylic anhydride group, carboxyl group, glycidyl group, hydroxyl group, amido group and alkoxysilyl group, or 0.01-70% by weight of the total of a chloro group and at least one member selected from the group consisting of said functional groups.

The hydrogenated block copolymer in (ii) above contains 0.01-70% by weight of at least one member selected from the group consisting of a chloro group and the functional groups as mentioned above concerning the polyolefin and is composed of at least one aromatic vinyl compound polymer block and at least one aliphatic diene polymer block.

The component (ii) may be the polyolefin alone, or the hydrogenated block copolymer alone, or a combination of the polyolefin and the hydrogenated block copolymer.

The adhesive synthetic resin (i) may be the same as that as mentioned above including a commercially available aqueous emulsion adhesive with respect to the first aspect of the present invention.

The second resin component is the (ii) as above which will be sometimes referred to as "functional group/Cl-containing polyolefin etc.".

The component (ii) may be prepared by introducing the above-mentioned functional group and/or chloro into polyolefin etc. obtained by a conventional preparation process.

The introduction of the functional group other than chloro may be carried out in the same manner described above at to the first aspect of the invention.

The chloro group may be introduced into polyolefin etc. by the following known methods. That is, chlorine gas is introduced into polyolefin etc., dissolved in a solvent such as tetrachloroethane and the like, suspended in an aqueous suspension, or in a gas phase at a reaction temperature 30°-120° C. at atmospheric pressure to 10 kg/cm$^2$G, and if desired, in combination with a means for enhancing the reaction efficiency such as using a radical initiator, irradiation with ultraviolet rays and the like, and the chlorinating reaction is carried out usually for 1-10 hours.

The introduction of the functional groups and chloro is not limited to one member, but two or more members may be introduced. In particular, it is preferable to combine chloro and the functional group excluding chloro from standpoints of adhesive characteristics and storing stability. In such a case, chloro may be introduced into polyolefin etc. before, after or simultaneously with introducing the functional group excluding chloro by a graft polymerization.

When the chlorinating reaction is carried out before the functional group excluding chloro is introduced into polyolefin etc., the functional group excluding chloro can be introduced by using, in place of a vinyl monomer containing the functional group excluding chloro, a compound having an active group capable of reacting with chloro such as mercapto group, amino group and the like and the above mentioned functional group, for example, τ-mercaptopropyl trimethoxy silane, τ-aminopropyl triethoxy silane and the like, and carrying out the reaction in the presence of an acid acceptor and a radical initiator.

It is desired that the content of the functional group and/or chloro in functional group/Cl-containing polyolefin etc. is 0.01-70% by weight. When the content is outside said range, the adhesive strength of the adhesive composition is not sufficient.

Furthermore, it is preferable to introduce, in addition to the above mentioned functional group and/or chloro, other monomer such as acrylic acid esters, methacrylic acid esters and the like in an amount of 60% by weight or less into polyolefin etc. by graft polymerization from the standpoints of storing stability and light resistance.

That is, as component (ii), there may be used 0.05-40 parts by weight of a polyolefin containing 0.01-70% by weight at least one member selected from the group consisting of carboxylic anhydride group, carboxyl group, glycidyl group, hydroxyl group, amido group, alkoxysilyl group and chloro and/or a hydrogenated block copolymer containing 0.01-70% by weight of at least one member selected from the group described immediately above, composed of at least one aromatic vinyl compound polymer block and at least one aliphatic diene polymer block, 60% by weight or less, based on the weight of said polyolefin and/or said hydrogenated block copolymer, of a monomer capable of radical polymerization other than the members of the groups being grafted onto the polyolefin and/or the hydrogenated block copolymer.

Such monomers which can be introduced may be grafted onto polyolefin etc. simultaneously with the chlorination or graft polymerization of a vinyl monomer having the functional group excluding chloro, or in the presence of a radical initiator before or after those reactions.

The emulsion adhesive composition essentially contains the adhesive synthetic resin, the functional group/Cl-containing polyolefin etc. and the photostabilizer. The amount of the functional group/Cl-containing polyolefin etc. is 0.05-40 parts by weight based on 100 parts of the adhesive synthetic resin. When the proportions of components are outside this range, the adhesive strength of the resulting adhesive composition is lowered.

The emulsion adhesive composition may be an aqueous emulsion.

As photostabilizers in the present invention, there may be used known photosensitizers having a function capable of inhibiting deterioration of high polymer compounds caused by light, for example, a function capable of absorbing ultraviolet rays, scavenging radicals, absorbing excitation energy, or the like.

Exemplary suitable ultraviolet ray absorbers include salicylates such as phenyl salicylate, p-t-butyl salicylate, p-octylphenyl salicylate, phenyl-3-phenyl salicylate, 2,6-dimethylphenyl salicylate, 2,6-dimethylphenyl-5-butyl salicylate, 2,6-dimethyl-4-octadecylphenyl salicylate, 2,6-dimethylphenyl-4-dodecyloxysalicylate, 2-dodecyl-4-methylphenyl salicylate, p octylphenyl-5-octyl salicylate, p-t-butylphenyl-4-dodecycloxysalicylate and the like; benzophenones such as 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, bis(5-benzoyl-4-hydroxy-2-methoxyphenyl)methane, 2,2'-dihydroxy-4-methoxybenzophenone, 2,2'-di-hydroxy-4,4'- dimethoxybenzophenone,- 2,2',4,4'-tetrahydroxybenzophenone, 4-dodecyloxy-2-hydroxybenzophenone, 2-hydroxy-4-methoxy-2'-carboxybenzophenone and the like; benzotriazoles such as 2-(2'-hydroxy-5'-methylphenyl) benzotriazole, 2-[2'-hydroxy-3',5'-bis(α,α'-dimethylbenzyl) phenyl] benzotriazole, 2-(2'-hydroxy-3',5'-di-t-butylphenyl) benzotriazole, 2-(2'-hydroxy-3'-t-butyl-5'-methyl-phenyl)-5-chlorobenzotriazole, 2-(2'-hydroxy-3,',5'-di-t-amyl) benzotriazole, 2-(2'-hydroxy-5'-t-octylphenyl)benzotriazole, 2,2'-methylenebis[4-(1,1,3,3-tetramethylbutyl)-

6-(2N- benzotriazol-2-yl)phenol], methyl-3-[3-t-butyl-5-(2H-benzotriazol-2-yl)-4-hydroxyphenyl]pro-pionatepolyethyleneglycol condensate, 2-(2-hydroxy-3-allyl-5-methylphenyl)benzotriazole dibutyl maleate copolymer, 2-(2-hydroxy-3-allyl-5-methylphenyl) benzotriazole dicyclohexyl maleate copolymer and the like; cyanoacrylates such as ethyl-2-cyano-3,3-diphenyl acrylate, 2-ethylhexyl-2-cyano-3,3'-diphenyl acrylate, butyl-2-cyano-3-methyl-3-(p-methoxyphenyl)acrylate and the like; and oxalic anilides such as 2-ethoxy-2'-ethyl oxalic bisanilide, 2-ethoxy-5-t-butyl-2'-ethyl oxalic bisanilide and the like.

Exemplary suitable radical scavengers include hindered amine type radical scavengers or inhibitors such as 4-benzoyloxy-2,2,6,6-tetramethylpyridine, bis(2,2,6,6-tetramethyl-4-piperidyl) sebacate, bis(1,2,2,6,6-pentamethyl-4-piperidyl)sebacate, bis(1,2,2,6,6-pentamethyl-4-piperidyl) 2-(3,5-di-t-butyl-4-hydroxybenzyl)-2-n-butyl malonate, tetrakis (2,2,6,6-tetramethyl-4-piperidyl)-1,2,3,4-butanetetracarboxylate, tetrakis(1,2,2,6,6-pentamethyl-4-piperidyl) 1,2,3,4-butanetetracarboxylate, bis(2,2,6,6-tetramethyl-4-piperidyl)di(tridecyl)-1,2,3,4-butanetetracarboxylate. tris(2,2,6,6-tetramethyl-4-piperidyl) mono(tridecyl)-1,2,3,4-butanetetracarboxylate, bis(1,2,2,6,6- pentamethyl-4-piperidyl)di(tridecyl)-1,2,3,4- butanetetracarboxylate, tris(1,2,2,6,6-tetramethyl-4-piperidyl) mono(-tridecyl)-1,2,3,4-tetracarboxylate, 3,9-bis[1,1-dimethyl-2-[tris(2,2,6,6-tetramethyl-4-piperidyloxycarbonyl) butylcarbonyloxyethyl]-2,4,8,10 tetraoxaspiro[5,5]undecane, 3,9-bis[1,1-dimethyl-2-[tris(1,2,2,6,6-pentamethyl-4-piperidyloxycarbonyl)butylcarbonyloxy]ethyl]-2,4,8,10-tetraoxaspiro[5,5]undecane, N-(2,2,6,6-tetramethyl-4-piperidyl)dodecyl succinic imide, 1-(2-hydroxyethyl)-2,2,6,6-tetramethyl-4-piperidinol/-dimethyl succinate polycondensate, 2-t-octylamino-4,6-dichlorotriazine/ N,N'-bis(2,2,6,6-tetramethyl-4-piperidyl)hexamethylenediamine polycondensate, 1,6-bis(2,2,6,6-tetramethyl-4-piperidylamino) hexane/dibromoethane polycondensate, and the like.

Exemplary suitable quenchers capable of absorbing excitation energy include nickel type quenchers such as nickel dibutyl-dithiocarbamate, nickel-bis(octylphenyl)-sulfide, [2,2'-thio bis(4-t-octylphenolate)]-n-butylamine nickel, [2,2'-thio-bis(4-t-octylphenolate)]-2-hexylamine nickel, 2,2'-thio-bis(4-t-octylphenolate) triethanolamine nickel and the like.

These photostabilizers may be used alone or in combination. In particular, when an ultraviolet ray absorber and a hindered amine type radical scavenger are used in combination, a preferable result is obtained.

The amount of photostabilizer is usually 0.1-20 parts by weight based on 100 parts by weight of the total amount of the above mentioned adhesive synthetic resin component, the functional group-containing polyolefin and other. When the amount of photostabilizer is less than 0.1 parts by weight, the photostability is not sufficiently improved. When the amount exceeds 20 parts by weight, the adhesivity is lowered.

The emulsion adhesive composition containing a photostabilizer may be prepared by the following process.

To the above mention (A) (i) an aqueous emulsion of the adhesive synthetic resin is added (B) a solution composed of (ii) functional group/Cl-containing polyolefin etc., (iii) a photostabilizer and (iv) an organic solvent. When an organic solvent is not used, the adhesive strength of the resulting adhesive is insufficient. The amount of the organic solvent used is not particularly limited as far as the functional group/Cl-containing polyolefin etc. can be sufficiently dissolved therein, but is usually 2-30 times the amount of the functional group/Cl-containing polyolefin etc.

A photostabilizer may be added in various ways, for example adding a photostabilizer first to (A) an aqueous emulsion, or adding a photostabilizer after adding (B) a solution excluding a photostabilizer to (A) an aqueous emulsion. However, it is preferable to add a photostabilizer dissolved in (B) a solution to (A) an aqueous emulsion as mentioned above since the dispersion is good.

The organic solvent usable in the invention may be any one in which the above mentioned functional group/Cl-containing polyolefin etc. and the photostabilizer can be dissolved therein. The examples include aromatic hydrocarbons such as toluene, xylene and the like, chlorinated hydrocarbons such as trichloroethylene, dichloroethane, trichloroethane and the like, aliphatic hydrocarbon such as heptane, octane, decane and the like, ketones and esters. These can be used alone or in combination.

To the above mentioned solution, a synthetic resin such as petroleum resin, amino resin and the like and a stabilizer other than a photostabilizer may be added in an amount which does not adversely affect characteristics of the adhesive composition of the present invention, and further a surfactant or an aqueous solution of a surfactant may be added thereto and mixed therewith, and then the resulting solution may be added to the aqueous emulsion of the adhesive synthetic resin.

When a commercially available aqueous emulsion adhesive is used as an aqueous emulsion of the adhesive synthetic resin and the above-mentioned solution is added thereto, sometimes the resulting adhesive composition becomes paste. This can be avoided by previously adding water to the commercially available aqueous emulsion adhesive and as a result the emulsion state can be stably maintained even after adding the above-mentioned solution.

In this manner, the emulsion adhesive composition of the present invention can be obtained. From the standpoint of handling, it is preferable that the concentration of the resin component in the adhesive composition is about 10%–65 % by weight and the viscosity is about 100 cps–30,000 cps.

When a relatively large amount of organic solvent is used in the process of the preparation, a desired amount of the organic solvent may be removed by distilling the resulting emulsion under reduced pressure at a temperature range of from room temperature to about 80° C.

The emulsion adhesive composition of the present invention thus prepared can be used for adhering highly crystalline resin molded articles formed from materials such as polyolefin, nylon and the like, to each other and adhesion for surface decoration, such as pile planting processing of said molded articles. The adhesion procedure may be the same known procedures employed for conventional aqueous emulsion adhesive.

The emulsion adhesive composition of the present invention can adhere a molded article in a solid state of a highly crystalline resin, such as polyolefin, nylon and the like to an optional material, without a complicated surface treatment.

As is clear from the examples (infra), the peeling strength in a cloth adhesion test is, for example, from 0.65 kg f/cm to 2.35 kg f/cm for the emulsion adhesive composition of the present invention. These values are about 4–15 times those for conventional emulsion adhesives which do not contain the functional group containing polyolefin etc.

Further, the emulsion adhesive composition additionally containing a photostabilizer of the present invention can exhibit excellent light resistance. As is clear from the examples (infra), the emulsion adhesive composition containing a photostabilizer gives a peeling strength in the cloth adhesion test of, for example, 0.70–2.35 kg f/cm and a discoloration in the pile planting, light resistance test of grade 4.0–grade 4.5 and no peeling of pile is observed. Therefore, the emulsion adhesive composition of the present invention exhibits remarkably excellent initial adhesion and light resistance as compared with conventional emulsion adhesive not containing the functional group/chloro-containing polyolefin etc. and a photostabilizer. Furthermore, the storing stability is also improved.

The present invention will be further explained by referring to the following examples and comparative examples. However, the examples should not be construed to limit the present invention.

The adhesion characteristics of the emulsion adhesive composition without photostabilizers are evaluated by (1) cloth adhesion test and (2) pile planting test while those of the emulsion adhesive composition containing photostabilizers are evaluated by (1) cloth adhesion test for initial adhesion and (3) pile planting, light resistance test for light resistance.

(1) Cloth Adhesion Test (i)Test material

An injection molded piece of polypropylene (10 cm long, 2 cm wide, 3 mm thick) and a cloth piece made of polyacrylonitrile fiber (10 cm long, 2 cm wide) are used.
(ii) Adhesion By using a brush, an adhesive composition is applied to one end portion having an area of 2 cm square of each of the above-mentioned injection molded piece and cloth piece and the coated surfaces and the non-coated surfaces are superposed and adhered. The matter thus adhered is then dried for 30 min. at 80° C. and allowed to stand at room temperature for 24 hours.

(iii) Measurement of Adhesive Strength

By using a tensile testing machine at room temperature, the ends of the non-adhered portions of the test material are pulled in two directions at an angle of 180° C. at a speed of 20 mm/min. and the peeling strength is measured.

(Unit: kg f/cm)

(2) Pile Planting Test (i) Test Material

An injection molded piece of polypropylene (10 cm long, 10 cm wide, 3 mm thick) and nylon pile (3 denier, 1 mm long) are used.

(ii) Pile Planting

An adhesive composition is applied to the above mentioned injection molded piece in a thickness of 150–300 g/m, and nylon pile is planted thereon at a voltage of 70 KV by using an electrostatic pile planting machine and then dried at 80° C. for 30 min. followed by standing at room temperature for 24 hours.

(iii) Adhesion Characteristic

At room temperature, a load of 200 g is applied to the surface of the planted pile with a cutter and then the cutter is rotated. It is confirmed whether the adhesive composition is peeled off from the injection molded piece.

(3) Pile Planting, Light Resistance Test (i) Test Material

An injection molded piece of polypropylene (10 cm long, 10 cm wide, 3 mm thick) and nylon pile (3 denier thick, 1 mm long) dyed sable with a dye are used.

(ii) Pile Planting

An adhesive composition is applied to the abovementioned injection molded piece in a thickness of 150–300 g/cm$^2$, and nylon pile is planted thereon at a voltage of 70 KV by using an electrostatic pile planting machine and then dried at 80° C. for 30 min. followed by standing at room temperature for 24 hours.

(iii) Light Resistance

The molded piece thus planted with pile is irradiated with ultraviolet ray using a high temperature ultraviolet ray fade meter (supplied by Suga Shikenki K.K.) at 83° C. for 400 hours.

After the irradiation, this discoloration of the planted surface is measured by means of gray scale (JIS L 0804).

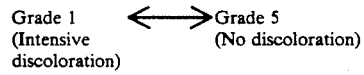

Grade 1     ⟵⟶   Grade 5
(Intensive discoloration)     (No discoloration)

By scratching the planted portion with a nail, it is confirmed whether the pile is peeled.

EXAMPLE 1

An isotactic polypropylene having intrinsic viscosity [$\eta$] of 2.5 dl/g was dissolved in xylene and then grafted with maleic anhydride under graft polymerization conditions, i.e. at 125° C. in the presence of dicumyl peroxide as a radical initiator.

The resulting polymer product was precipitated by adding acetone, and filtered and washed with acetone twice followed by drying under reduced pressure to obtain a carboxylic anhydride group-containing polypropylene. The carboxylic anhydride group-containing polypropylene was dissolved in chlorobenzene at 110° C. and then chlorinated at this temperature by feeding chlorine gas. After completion of the reaction, methanol was added to precipitate the polymer, filtered and the polymer was washed with methanol twice and dried under reduced pressure to give a carboxylic anhydride group containing, chlorinated polypropylene comprising 2.9% by weight of carboxylic anhydride group and 30.0% by weight of chlorine.

12 g of the resulting carboxylic anhydride group-containing, chlorinated polypropylene was dissolved in 150 ml of xylene. The resulting xylene solution was added to and mixed with an aqueous emulsion of an adhesive synthetic resin composed of 400 g of a commercially available acrylic acid ester-styrene copolymer resin type aqueous emulsion adhesive (YODOSOL AA57, tradename, containing 40% by weight of resin component, supplied by Kanebo NSC, LTD.) and 80 g of water to obtain an emulsion type adhesive composition of the present invention.

The resulting adhesive composition was subjected to the cloth adhesion test. The peeling strength was 2.35 kgf/cm. The composition was also subjected to the pile planting test, and no peeling of the adhesive composition was observed and the adhesivity was good.

Comparative Example 1

Repeating the procedure of Example 1 except that the xylene solution of the carboxylic anhydride group-containing, chlorinated polypropylene was not added and the commercially available acrylic acid ester-styrene copolymer resin type aqueous emulsion adhesive was used as it was. The cloth test and pile planting test were effected in the same way as in Example 1.

Comparative Examples 2 and 3, and Examples 2 and 3

Repeating the procedure of Example 1 except that the addition ratio of the carboxylic anhydride group-containing, chlorinated polypropylene to the adhesive synthetic resin component was varied as shown in Table 1, there were obtained adhesive compositions, which were then subjected to the cloth adhesion test and the pile planting test.

Comparative Example 4

Repeating the procedure of Example 1 except that the acrylic acid ester-styrene copolymer resin type aqueous emulsion adhesive was not used and only the xylene solution of the carboxylic anhydride group-containing, chlorinated polypropylene was used as an adhesive composition, the resulting adhesive composition was subjected to the cloth adhesion test and pile planting test.

Comparative Example 5

Repeating the procedure of Example 1 except that the carboxylic anhydride group-containing, chlorinated polypropylene was not dissolved in xylene, but pulverized at −40° C. by a pulverizer and 12 g of the polypropylene thus pulverized was added to and mixed with an aqueous emulsion produced by adding water to the acrylic acid ester-styrene copolymer resin type aqueous emulsion adhesive, an adhesive composition was obtained and subjected to the cloth adhesion test and the pile planting test.

Comparative Examples 6–7, and Examples 4–6

Repeating the procedure of Example 1 except that in place of the carboxylic anhydride group-containing, chlorinated polypropylene there were used carboxyl group-containing propylene-ethylene random copolymers having different carboxyl group contents, as shown in Table 1, and produced by grafting various amounts of maleic acid on a propylene-ethylene random copolymer having intrinsic viscosity [$\eta$] of 2.0 dl/g and containing 35% by weight of ethylene. The resulting adhesive compositions were subjected to the cloth adhesion test and the pile planting test.

EXAMPLE 7

Repeating the procedure of Example 1 except that in place of the carboxylic anhydride group-containing, chlorinated polypropylene, there was used 10 g of a carboxylic anhydride group containing, n-butyl acrylate modified poly 4-methylpentene-1 produced by dissolving isotactic poly 4-methylpentene-1 having intrinsic viscosity [$\eta$] of 3.5 dl/g, grafting maleic anhydride thereonto at 145° C. using dicumyl peroxide as a radical initiator and then grafting n-butyl acrylate thereon and containing 2.2% by weight of carboxylic anhydride group and 20% by weight of n-butyl acrylate, an adhesive composition was produced, which was then subjected to the cloth adhesion test and the pile planting test.

EXAMPLE 8

Repeating the procedure of Example 1 except that in place of the carboxylic anhydride group containing, chlorinated polypropylene there was used 8 g of a hydrogenated, carboxylic anhydride group-containing styrene-isoprene block copolymer produced by dissolving a hydrogenated styrene-isoprene block copolymer (KRATON G1701, tradename, supplied by Shell Chemical Co.) in xylene and grafting maleic anhydride thereonto at 125° C. using dicumyl peroxide as a radical initiator and containing 2.6% by weight of carboxylic anhydride group. The resulting adhesive composition was subjected to the cloth adhesion test and the pile planting test

EXAMPLE 9

A propylene ethylene random copolymer having intrinsic viscosity [$\eta$] of 2.6 dl/g and containing 40% by weight of ethylene was dissolved in xylene, then grafted with $\tau$-methacryloxypropyl methyl dimethoxy silane at 80° C. using benzoyl peroxide as a radical initiator, and further grafted with maleic anhydride to obtain an alkoxysilyl group and carboxylic anhydride group-containing propylene-ethylene random copolymer containing 0.7% by weight of alkoxysilyl group and 1.2% by weight of carboxylic anhydride group.

12 g of the resulting functional group-containing propylene-ethylene random copolymer was added to 150 ml of xylene and dissolved therein. Then, the solution of the functional group-containing propylene-ethylene random copolymer in xylene was added to and mixed with an aqueous emulsion of an adhesive synthetic resin composed of 400 g of a commercially available ethylene-vinyl acetate copolymer resin type aqueous emulsion adhesive (MOVINYL 085E, tradename, 55% by weight of resin component, supplied by Hoechst Gosei K.K.) and 100 g of water, and thereby an adhesive composition was produced. The resulting adhesive composition was subjected to the cloth adhesion test and pile planting test in the same manner as in Example 1.

Comparative Example 8

Repeating the procedure of Example 9, except that the solution of the alkoxy silyl group and carboxylic anhydride-containing propylene-ethylene random copolymer in xylene was not added and the commercially available ethylene-vinyl acetate copolymer resin type aqueous emulsion adhesive was used as it was, and the cloth adhesion test and pile planting test were conducted.

EXAMPLE 10

Propylene-butene-1 random copolymer having intrinsic viscosity [$\eta$] of 3.0 dl/g and containing 2.0% by weight of butene-1 was dissolved in xylene, grafted with glycidyl methacrylate under graft polymerization conditions, i.e. at 130° C. in the presence of dicumyl peroxide as a radical initiator, and then subjected to a chlorination reaction in the same way as in Example 1 to produce a glycidyl group-containing, chlorinated propylene-butene-1 copolymer containing 1.2% by weight of glydidyl group and 18.0% by weight of chlorine.

8 g of the resulting glycidyl group-containing, chlorinated propylene butene-1-copolymer was dissolved in 150 ml of toluene The resulting toluene solution was added to an aqueous emulsion of an adhesive synthetic resin composed of 450 g of a commercially available acrylic acid ester-styrene copolymer resin type aqueous emulsion adhesive (SAIVINOL FX-4, tradename, supplied by Saiden Chemical Industry Co., Ltd., containing 35% by weight of resin component) and 50 g of water to produce an emulsion adhesive composition. The resulting adhesive composition was subjected to the cloth adhesion test and the pile planting test in the same manner as in Example 1.

Comparative Example 9

Repeating the procedure of Example 10 except that the xylene solution of glycidyl group-containing, chlorinated propylene butene-1 copolymer was not added and the commercially available acrylic acid ester-styrene copolymer resin type aqueous emulsion adhesive was used as it was. The cloth adhesion test and the pile planting test were effected in the same manner described in Example 10.

EXAMPLE 11

Repeating the procedure of Example 10 except that graft polymerization was conducted using 2-hydroxyethyl methacrylate in place of glycidyl methacrylate followed by a chlorination reaction and 10 g of the resulting hydroxy group-containing, chlorinated propylene-butene-1 copolymer containing 0.7% by weight of hydroxy group and 5.0% by weight of chlorine was used in place of glycidyl methacrylate group containing, chlorinated propylene butene-1 copolymer. The resulting adhesive composition was subjected to the cloth adhesion test and pile planting test.

EXAMPLE 2

An isotactic polypropylene having intrinsic viscosity [$\eta$] of 4.5 dl/g was dissolved in xylene and then grafted with acrylamide under graft polymerization condition, i.e. using benzoyl peroxide as a radical initiator at 80° C.

After completion of the reaction, the resulting polymer was precipitated by adding acetone, filtered, washed with ace&one twice, and dried under reduced pressure to obtain an acetamide group-containing polypropylene, which was then dissolved in chlorobenzene at 120° C. and chlorinated at the same temperature by feeding a chlorine gas. After completion of the reaction, the polymer was precipitated by adding methanol, filtered, washed with methanol twice, and dried under reduced pressure to give an amide group-containing chlorinated polypropylene containing 2.2% by weight of amide group and 41.0% by weight of chlorine. Repeating the procedure of Example 10 except that 8 g of the amide group-containing, chlorinated polypropylene was used in place of the glycidyl group-containing, chlorinated propylene-butene-1 copolymer. An emulsion type adhesive composition was obtained and subjected to the cloth adhesion est and the pile planting test.

TABLE 1

| | | Functional group-containing polyolefin etc. | | | | | |
|---|---|---|---|---|---|---|---|
| | | Functional group | | Chlorine | Other graft polymerization modification | | Addition ratio (Parts by weight/ |
| Example or Comparative Example No. | Starting material polyolefin etc. Type (Note 1) | Type | Amount (% by weight) | Amount (% by weight) | Monomer | Amount % by weight | 100 parts by weight of adhesive synthetic resin) |
| Example 1 | IPP | Carboxylic anhydride group | 2.9 | 30.0 | — | — | 7.5 |
| Comp. Ex. 1 | — | — | — | — | — | — | — |
| Comp. Ex. 2 | IPP | Carboxylic anhydride group | 2.9 | 30.0 | — | — | 0.01 |
| Example 2 | IPP | Carboxylic anhydride group | 2.9 | 30.0 | — | — | 0.9 |
| Example 3 | IPP | Carboxylic anhydride group | 2.9 | 30.0 | — | — | 15.0 |
| Comp. Ex. 3 | IPP | Carboxylic anhydride group | 2.9 | 30.0 | — | — | 80.0 |
| Comp. Ex. 4 | IPP | Carboxylic anhydride group | 2.9 | 30.0 | — | — | (12 g) |
| Comp. Ex. 5 | IPP | Carboxylic anhydride group | 2.9 | 30.0 | — | — | 7.5 |
| Comp. Ex. 6 | PER | Carboxyl group | 0.005 | — | — | — | 7.5 |
| Example 4 | PER | Carboxyl group | 0.5 | — | — | — | 7.5 |
| Example 5 | PER | Carboxyl group | 4.7 | — | — | — | 7.5 |
| Example 6 | PER | Carboxyl group | 11.0 | — | — | — | 7.5 |
| Comp. Ex. 7 | PER | Carboxyl group | 22.2 | — | — | — | 7.5 |
| Example 7 | IPMP | Carboxylic | 2.2 | — | n-Butyl | 20.0 | 6.3 |

TABLE 1-continued

| | | Functional group-containing polyolefin etc. | | | | | |
|---|---|---|---|---|---|---|---|
| | | anhydride group | | | acrylate | | |
| Example 8 | SEP | Carboxylic anhydride group | 2.6 | — | — | — | 5.0 |
| Example 9 | PER | Alkoxysilyl group | 0.7 | | | | |
| | | Carboxylic anhydride group | 1.2 | — | — | — | 5.5 |
| Comp. Ex. 8 | — | — | — | — | — | — | — |
| Example 10 | PBR | glycidyl group | 1.2 | 18.0 | — | — | 5.1 |
| Comp. Ex. 9 | — | — | — | — | — | — | — |
| Example 11 | PBR | Hydroxyl group | 0.7 | 5.0 | — | — | 6.3 |
| Example 12 | IPP | Amide group | 2.2 | 41.0 | — | — | 5.1 |

| Example or Comparative Example No. | Organic Solvent | Aqueous emulsion of adhesive synthetic resin Type | Adhesion test results | |
|---|---|---|---|---|
| | | | Cloth adhesion test Peel strength (kgf/cm) | Pile planting test Peeling of adhesive composition |
| Example 1 | Xylene | acrylic acid ester-styrene copolymer resin | 2.35 | no |
| Comp. Ex. 1 | — | acrylic acid ester-styrene copolymer resin | 0.16 | Yes (all surface peeled) |
| Comp. Ex. 2 | Xylene | acrylic acid ester-styrene copolymer resin | 0.25 | yes |
| Example 2 | Xylene | acrylic acid ester-styrene copolymer resin | 1.50 | no |
| Example 3 | Xylene | acrylic acid ester-styrene copolymer resin | 2.10 | no |
| Comp. Ex. 3 | Xylene | acrylic acid ester-styrene copolymer resin | 0.41 | yes |
| Comp. Ex. 4 | Xylene | — | 0.06 | Yes (all surface peeled) |
| Comp. Ex. 5 | — | acrylic acid ester-styrene copolymer resin | 0.23 | yes |
| Comp. Ex. 6 | Xylene | acrylic acid ester-styrene copolymer resin | 0.18 | yes |
| Example 4 | Xylene | acrylic acid ester-styrene copolymer resin | 0.65 | no |
| Example 5 | Xylene | acrylic acid ester-styrene copolymer resin | 1.40 | no |
| Example 6 | Xylene | acrylic acid ester-styrene copolymer resin | 1.15 | no |
| Comp. Ex. 7 | Xylene | acrylic acid ester-styrene copolymer resin | 0.30 | yes |
| Example 7 | Xylene | acrylic acid ester-styrene copolymer resin | 2.30 | no |
| Example 8 | Xylene | acrylic acid ester-styrene copolymer resin | 1.25 | no |
| Example 9 | Xylene | Ethylene-vinyl acetate copolymer resin | 0.74 | no |
| Comp. Ex. 8 | — | Ethylene-vinyl acetate copolymer resin | 0.17 | yes (all surface peeled) |
| Example 10 | Toluene | acrylic acid ester-styrene copolymer resin | 2.00 | no |
| Comp. Ex. 9 | — | acrylic acid ester-styrene copolymer resin | 0.16 | yes (all surface peeled) |
| Example 11 | Toluene | acrylic acid ester-styrene copolymer resin | 1.45 | no |
| Example 12 | Toluene | acrylic acid ester-styrene | 2.20 | no |

TABLE 1-continued

Functional group-containing polyolefin etc.

copolymer resin (Note 1)
IPP: Isotactic polypropylene
PER: Propylene-ethylene random copolymer
IPMP: Isotactic poly 4-methylpentene-1
SEP: Styrene-isoprene block copolymer hydrogenated product
PBR: Propylene-butene-1 random copolymer

EXAMPLE 13

An isotactic polypropylene having intrinsic viscosity [$\eta$] of 3.0 dl/g was dissolved in chlorobenzene at 110° C., and then chlorinated at the same temperature by feeding a chlorine gas. After completion of the reaction, the resulting polymer was precipitated by adding methanol, filtered, washed with methanol twice, and then dried under reduced pressure to produce a chlorinated polypropylene. The resulting chlorinated polypropylene was dissolved in xylene and then grafted with n-butyl acrylate using benzoyl peroxide as a radical initiator at 80° C. to produce n-butyl acrylate-modified, chlorinated polypropylene containing 20.5% by weight of chlorine and 35.0% by weight of n-butyl acrylate.

16 g of the resulting n-butyl acrylate-modified, chlorinated polypropylene was dissolved in 150 ml of xylene. Further, as photostabilizers, 5.3 g of an ultraviolet ray absorber, methyl-3-[3-t-butyl-5-(2H-benzotriazol-2-yl)-4-hydroxyphenyl]propionate/polyethylene glycol condensate (TINUVIN 213, tradename, supplied by Ciba Geigy), and 2.6 g of a hindered amine type photostabilizer, bis(1,2,2,6,6-pentamethyl-4-piperidyl)sebacate (SANOL, tradename, supplied by Sankyo Co.Ltd.), were added thereto and dissolved therein.

80 g of water was added to 400 g of a commercially available acrylic acid ester-styrene copolymer resin type aqueous emulsion adhesive (YODOSOL AA57, tradename, containing 40% by weight of resin component, supplied by Kanebo-NSC, LTD.) to prepare an aqueous emulsion of adhesive synthetic resin. To the resulting aqueous emulsion was added the solution of the n-butyl acrylate-modified, chlorinated polypropylene and the photostabilizer in xylene as prepared above and mixed to prepare an emulsion adhesive composition of the present invention.

The resulting emulsion adhesive composition was subjected to the cloth adhesion test and the peeling strength was 2.30 kg f/cm. The pile planting, light resistance test was also effected and the degree of discoloration was grade 4.5. Upon conducting a nail scratching test, no peeling of pile was observed, and further, the light resistance was good.

Comparative Example 10

The procedure of Example 13 was repeated except that a solution of the n-butyl acrylate-modified, chlorinated polypropylene prepared without adding the photostabilizer in xylene was incorporated with the aqueous emulsion of the adhesive synthetic resin and an adhesive composition was obtained.

The resulting adhesive composition was subjected to the cloth adhesion test and the pile planting, light resistance test following the procedures in Example 13.

The test results of Comparative Example 10 seqq are shown in the following tables together with the test result of Example 13.

Comparative Example 11

The procedure of Example 13 was repeated except that the commercially available acrylic acid ester-styrene copolymer resin type aqueous emulsion adhesive was used as it was without adding the solution of the n-butyl acrylate-modified, chlorinated polypropylene and the photostabilizer in xylene. The cloth adhesion test and the pile planting test were conducted in the same manner as in Example 13.

Comparative Example 12

The procedure of Example 13 was repeated except that only the solution of the n-butyl acrylate-modified, chlorinated polypropylene and the photostabilizer in xylene was used as an adhesive composition without using the acrylic acid ester-styrene resin type aqueous emulsion adhesive, and the cloth adhesion test and the pile planting, light resistance test were effected in the same way as in Example 13.

Comparative Example 13

The procedure of Example 13 was repeated except that the n-butyl acrylate-modified, chlorinated polypropylene was not dissolved in xylene, but pulverized at a temperature of −40° C. with a pulverizer, and 16 g of the resulting n-butyl acrylate-modified, chlorinated polypropylene powder was mixed with the aqueous emulsion of the adhesive synthetic resin followed by adding the photostabilizer. The adhesive composition thus prepared was subjected to the cloth adhesion test and pile planting, light resistance test in the same way as in Example 13.

Comparative Examples 14 and 15, and Examples 14 and 15

Repeating the procedure of Example 13 except that the ratio of the photostabilizer to the synthetic resin component was varied as shown in the following table, an adhesive composition was prepared and the cloth adhesion test and the pile planting, light resistance test were effected.

Comparative Examples 16 and 17, and Examples 16–18

Repeating the procedure of Example 13 except that, in place of the n-butyl acrylate-modified, chlorinated polypropylene, functional group-containing propylene-ethylene random copolymers were used which had various carboxyl group contents as shown in the following table and were prepared by grafting a propylene-ethylene random copolymer having intrinsic viscosity [$\eta$] of 2.0 dl/g and containing 35% by weight of ethylene with a various amount of maleic acid, adhesive compositions were prepared and the cloth adhesion test and the pile planting, light resistance test were conducted.

EXAMPLE 19

The procedure of Example 13 was repeated except that, in place of the n-butyl acrylate-modified, chlorinated polypropylene, 12 g of a functional group-containing poly 4-methylpentene-1 containing 2.0% by weight of carboxylic anhydride group and 25.0% by weight of chlorine was used and further 4.0 g of the ultraviolet ray absorber and 2.0 g of a hindered amine type photostabilizer. i.e. bis(1,2,2,6,6-pentamethyl-4-piperidyl) 2-(3,5-di-t-butyl-4-hydroxybenzyl)-2-n-butylmalonate (TINUVIN 144, tradename, supplied by Ciba Geigy) were used, the functional group-containing poly 4-methylpentene-1 being prepared by dissolving an isotactic poly 4-methylpentene-1 in xylene, grafting maleic anhydride thereonto at 145° C. using dicumyl peroxide as a radical initiator and effecting chlorination in the same way described in Example 13.

The resulting adhesive composition wa subjected to the cloth adhesion test and the pile planting, light resistance test.

Comparative Example 18

Repeating the procedure of Example 19 except that a solution of the functional group-containing poly 4-methylpentene-1 in xylene without adding a photostabilizer was added to the aqueous emulsion of the adhesive synthetic resin, an adhesive composition was prepared. The resulting adhesive composition was subjected to the cloth adhesion test and the pile planting, light resistance test in the same manner described in Example 19.

EXAMPLE 20

A propylene-ethylene random copolymer having intrinsic viscosity [η] of 2.6 dl/g and containing 40% by weight of ethylene was dissolved in xylene, grafted with maleic anhydride using benzoyl peroxide as a radical initiator at 80° C., and further grafted with τ-methacryloxypropyl methyl dimethoxysilane to obtain a functional group-containing propylene-ethylene random copolymer containing 1.2% by weight of carboxylic anhydride group and 0.7% by weight of alkoxysilyl group.

12 g of the resulting functional group-containing propylene-ethylene random copolymer was dissolved in 150 ml of xylene. Further there were added thereto and dissolved therein photostabilizers, i.e. 4.0 g of an ultraviolet ray absorber, 2-(2'-hydroxy-3'-t-butyl-5'-methylphenyl)-5-chlorobenzotriazole (MARK LA-36, tradename, supplied by Adeka Argus Chemical Co., Ltd.) and 2.0 g of a hindered amine type photostabilizer, (1,2,2,6,6-pentamethyl-4-piperidyl/tridecyl mixed)-1,2,3,4-butane tetracarboxylate (MARK LA-62, tradename, supplied by Adeka Argus Chemical Co., Ltd.).

The resulting solution of the functional group-containing propylene-ethylene random copolymer in xylene was added to an aqueous emulsion of adhesive synthetic resin prepared by adding 100 g of water to 400 g of a commercially available ethylene vinyl acetate copolymer resin type aqueous emulsion adhesive (MOVINYL 085E, tradename, containing 55% by weight of resin component, supplied by Hoechst Gosei K.K.) to prepare an adhesive composition. The resulting adhesive composition was subjected to the cloth adhesion test and the pile planting, light resistance test.

Comparative Example 19

Repeating the procedure of Example 20 except that a solution of the functional group-containing propylene-ethylene random copolymer in xylene prepared without adding a photostabilizer was added to the aqueous emulsion of the adhesive synthetic resin, an adhesive composition was obtained. The resulting adhesive composition was subjected to the cloth adhesion test and the pile planting, light resistance test in the same way described in Example 20.

Comparative Example 20

Repeating the procedure of Example 20 except that, without adding a solution of the functional group-containing propylene ethylene random copolymer and the photostabilizer in xylene, the commercially available ethylene-vinyl acetate copolymer resin type aqueous emulsion adhesive was used as it was, the cloth adhesion test and the pile planting, light resistance test in the same way described in Example 20.

EXAMPLE 21

A propylene-butene-1 random copolymer having intrinsic viscosity [η] of 3.0 dl/g and containing 2.0% by weight of butene-1 was dissolved in xylene, grafted with glycidyl methacrylate under graft polymerization conditions, i.e., at 130° C. using dicumyl peroxide as a radical initiator, and the chlorinated in the same manner described in Example 13 to produce a functional group-containing propylene-butene-1 copolymer containing 1.2% by weight of glycidyl group and 18.0% by weight of chlorine.

13 g of the resulting functional group-containing propylene-butene-1 copolymer was dissolved in 150 ml of toluene, and further 3.4 g of the ultraviolet& ray absorber used in Example 20 and 1.7 g of the hindered amine type photostabilizer used in Example 19 were added to and dissolved in the toluene solution.

Further, the resulting toluene solution containing the functional group-containing propylene-butene-1 copolymer and the photostabilizer was added to and dissolved in an aqueous emulsion of an adhesive synthetic resin prepared by adding 50 g of water to 450 g of a commercially available acrylic acid ester-styrene copolymer resin type aqueous emulsion adhesive (SAIVINOL FX-4, tradename, containing 35% by weight of resin component, supplied by Saiden Chemical Industry Co., Ltd.), and thereby an emulsion adhesive composition was produced.

The emulsion adhesive composition thus produced was subjected to the cloth adhesion test and the pile planting, light resistance test in the same way described in Example 13.

Comparative Example 21

Repeating the procedure of Example 21 except that a solution of the functional group containing propylene-butene-1 copolymer only in toluene prepared without adding a photostabilizer was added to the aqueous emulsion of adhesive synthetic resin, an adhesive composition was obtained, which was then subjected to the cloth adhesion test and the pile planting, light resistance test in the same manner described in Example 21.

Comparative Example 22

Repeating the procedure of Example 21 except that the toluene solution of the functional group-containing propylene-butene-1 copolymer and the photostabilizer was not added and the commercially available acrylic acid ester-styrene copolymer resin type aqueous emulsion adhesive was used as it was. The cloth adhesion test and the pile planting, light resistance test were effected in the same manner described in Example 21.

EXAMPLE 22

Repeating the procedure of Example 21 except that 10 g of a functional group-containing propylene-butene-1 copolymer prepared by chlorination first and then graft polymerization using 2-hydroxyethyl methacrylate in place of glycidyl methacrylate and containing 0.7% by weight of hydroxyl group and 8.0% by weight of chlorine was used as a functional group-containing polyolefin. The resulting adhesive composition was subjected to the cloth adhesion test and the pile planting, light resistance test.

EXAMPLE 23

An isotactic polypropylene having intrinsic viscosity [$\eta$] of 4.5 dl/g was dissolved in xylene, and grafted with acrylamide under graft polymerization condition, i.e. at 80° C. using benzoyl peroxide as a radical initiator.

After completion of the reaction, acetone was added to precipitate the resulting polymer.

The polymer was filtered off, washed with acetone twice, and dried under reduced pressure to obtain an amide group-containing polypropylene. The amide group-containing polypropylene was dissolved in chlorobenzene at 120° C. and chlorinated at the same temperature by feeding a chlorine gas.

After completion of the reaction, methanol was added to precipitate the resulting polymer. Then the polymer was filtered off, washed with methanol twice and dried under reduced pressure to obtain a functional group containing polypropylene containing 2.2% by weight of amide group and 41.0% by weight of chlorine.

Repeating the procedure of Example 21 except that 15 g of the resulting functional group-containing polypropylene was used in place of the functional group-containing propylene-butene-1 copolymer, an emulsion adhesive composition was prepared and subjected to the cloth adhesive test and the pile planting, light resistance test.

EXAMPLE 24

Repeating the procedure of Example 13 except that, in place of the n butyl acrylate-modified, chlorinated polypropylene, there was used 14 g of a functional group-containing, hydrogenated, styrene isoprene block copolymer containing 2.6% by weight of carboxylic anhydride group which was prepared by dissolving a hydrogenated styrene-isoprene block copolymer (KRATON G1701, tradename, supplied by Shell Chemical Co ) in xylene and grafting maleic anhydride thereonto at 125° C. using dicumyl peroxide as a radical initiator, an adhesive composition was prepared and the cloth adhesion test and the pile planting, light resistance test were evaluated.

TABLE 2

| Example or Comparative Example No. | Polyolefin etc. (Note 1) Type | Functional group Type | Functional group Amount (% by weight) | Graft polymerization other than introducing functional group Monomer | Graft polymerization other than introducing functional group Amount (% by weight) | Addition ratio (Parts by weight/100 parts by weight of adhesive synthetic resin) | Photostabilizer Ultraviolet ray absorber (Note 2) Type | Photostabilizer Ultraviolet ray absorber Addition ratio * |
|---|---|---|---|---|---|---|---|---|
| Example 13 | IPP | Chlorine | 20.5 | n-Butyl acrylate | 35.0 | 10.0 | UV-1 | 3.0 |
| Comp. Ex. 10 | IPP | Chlorine | 20.5 | n-Butyl acrylate | 35.0 | 10.0 | — | — |
| Comp. Ex. 11 | — | — | — | — | — | — | — | — |
| Comp. Ex. 12 | IPP | Chlorine | 20.5 | n-Butyl acrylate | 35.0 | (16 g) | UV-1 | (5.3 g) |
| Comp. Ex. 13 | IPP | Chlorine | 20.5 | n-Butyl acrylate | 35.0 | 10.0 | UV-1 | 3.0 |
| Comp. Ex. 14 | IPP | Chlorine | 20.5 | n-Butyl acrylate | 35.0 | 10.0 | UV-1 | 0.01 |
| Example 14 | IPP | Chlorine | 20.5 | n-Butyl acrylate | 35.0 | 10.0 | UV-1 | 0.6 |
| Example 15 | IPP | Chlorine | 20.5 | n-Butyl acrylate | 35.0 | 10.0 | UV-1 | 9.0 |
| Comp. Ex. 15 | IPP | Chlorine | 20.5 | n-Butyl acrylate | 35.0 | 10.0 | UV-1 | 20.0 |
| Comp. Ex. 16 | PER | Carboxyl group | 0.005 | — | — | 10.0 | UV-1 | 3.0 |
| Example 16 | PER | Carboxyl group | 0.5 | — | — | 10.0 | UV-1 | 3.0 |
| Example 17 | PER | Carboxyl group | 4.7 | — | — | 10.0 | UV-1 | 3.0 |
| Example 18 | PER | Carboxyl group | 11.0 | — | — | 10.0 | UV-1 | 3.0 |
| Comp. Ex. 17 | PER | Carboxyl group | 22.2 | — | — | 10.0 | UV-1 | 3.0 |
| Example 19 | IPMP | Carboxylic anhydride group | 2.0 | | | | UV-1 | 2.3 |
| | | Chlorine | 25.0 | — | — | 7.5 | | |
| Comp. Ex. 18 | IPMP | Carboxylic anhydride group | 2.0 | | | | — | — |
| | | Chlorine | 25.0 | — | — | 7.5 | | |

| Example or Comparative Example No. | Photostabilizer Radical scavenger (Note 3) Type | Photostabilizer Radical scavenger Addition ratio * | Organic solvent Type | Aqueous emulsion of adhesive synthetic resin (Note 4) Type | Evaluation results Cloth adhesion test Peel strength (kgf/cm) | Evaluation results Pile planting light resistance test Degree of discoloration (grade) | Evaluation results Pile planting light resistance test Peeling of pile Yes (X) No (O) |
|---|---|---|---|---|---|---|---|
| Example 13 | HALS-1 | 1.5 | Xylene | AST | 2.30 | 4.5 | O |
| Comp. Ex. 10 | — | — | Xylene | AST | 2.35 | 1.5 | X |

TABLE 2-continued

| | | | | Functional group-containing polyolefin etc. | | | |
|---|---|---|---|---|---|---|---|
| Comp. Ex. 11 | — | — | — | AST | 0.16 | 2.5 | X |
| Comp. Ex. 12 | HALS-1 | (2.6 g) | Xylene | — | 0.06 | 1.0 | X |
| Comp. Ex. 13 | HALS-1 | 1.5 | — | AST | 0.23 | 4.5 | X |
| Comp. Ex. 14 | HALS-1 | 0.005 | Xylene | AST | 2.35 | 1.5 | X |
| Example 14 | HALS-1 | 0.3 | Xylene | AST | 2.35 | 4.0 | O |
| Example 15 | HALS-1 | 4.5 | Xylene | AST | 1.90 | 4.5 | O |
| Comp. Ex. 15 | HALS-1 | 15.0 | Xylene | AST | 0.40 | 4.5 | X |
| Comp. Ex. 16 | HALS-1 | 1.5 | Xylene | AST | 0.18 | 4.5 | X |
| Example 16 | HALS-1 | 1.5 | Xylene | AST | 0.70 | 4.5 | O |
| Example 17 | HALS-1 | 1.5 | Xylene | AST | 1.40 | 4.0 | O |
| Example 18 | HALS-1 | 1.5 | Xylene | AST | 1.20 | 4.0 | O |
| Comp. Ex. 17 | HALS-1 | 1.5 | Xylene | AST | 0.35 | 3.5 | X |
| Example 19 | HALS-2 | 1.2 | Xylene | AST | 2.35 | 4.0 | O |
| Comp. Ex. 18 | — | — | Xylene | AST | 2.40 | 1.0 | X |

\* (Parts by weight/100 parts by weight of syntheitc resin component)
(Note 1)
IPP: Isotactic polyproplylene
PER: Propylene-ethylene random copolymer
IPMP: Isotactic poly 4-methylpentene-1
(Note 2)
UV-1: Methyl-3-[3-t-butyl-5-(2H-benzotriazol-2-yl)-4-hydroxyphenyl]propionate/polyethylene-glycol condensate
(Note 3)
HALS-1: Bis(1,2,2,6,6-pentamethyl-4-piperidyl)sebacate
HALS-2: Bis(1,2,2,6,6-pentamethyl-4-piperidyl) 2-(3,5-di-t-butyl-4-hydroxybenzyl)-2-n-butyl malonate
(Note 4)
AST: Acryl-styrene copolymer resin type aqueous emulsion

TABLE 3

| | | Functional group-containing polyolefin etc. | | | | | |
|---|---|---|---|---|---|---|---|
| | | Functional group | | Graft polymerization other than introducing functional group | | Addition ratio | Photostabilizer Ultraviolet ray absorber | |
| Example or Comparative Example No. | Polyolefin etc. (Note 1) Type | Type | Amount (% by weight) | Monomer | Amount (% by weight) | (Parts by weight/100 parts by weight of adhesive synthetic resin) | (Note 2) Type | Addition ratio * |
| Example 20 | PER | Carboxylic anhydride group | 1.2 | | | | UV-2 | 1.8 |
| | | Alkoxysilyl group | 0.7 | — | — | 5.5 | | |
| Comp. Ex. 19 | PER | Carboxylic anhydride group | 1.2 | | | | — | — |
| | | Alkoxysilyl group | 0.7 | — | — | 5.5 | | |
| Comp. Ex. 20 | — | — | — | — | — | — | — | — |
| Example 21 | PBR | Glycidyl group | 1.2 | | | | UV-2 | 2.0 |
| | | Chlorine | 18.0 | — | — | 8.3 | | |
| Comp. Ex. 21 | PBR | Glycidyl group | 1.2 | | | | — | — |
| | | Chlorine | 18.0 | — | — | 8.3 | | |
| Comp. Ex. 22 | — | — | — | — | — | — | — | — |
| Example 22 | PBR | Chlorine | 8.0 | | | | UV-2 | 2.0 |
| | | Hydroxy group | 0.7 | — | — | 6.3 | | |
| Example 23 | IPP | Amide group | 2.2 | | | | UV-2 | 2.0 |
| | | Chlorine | 41.0 | — | — | 9.5 | | |
| Example 24 | SEP | Carboxylic anhydride group | 2.6 | — | — | 8.8 | UV-1 | 3.0 |

| | Photostabilizer Radical scavenger | | Organic solvent Type | Aqueous emulsion of adhesive synthetic resin (Note 4) Type | Evaluation results | | |
|---|---|---|---|---|---|---|---|
| Example or Comparative Example No. | (Note 3) Type | Addition ratio * | | | Cloth adhesion test Peel strength (kgf/cm) | Pile planting light resistance test Degree of discoloration (grade) | Peeling of pile Yes (X) No (O) |
| Example 20 | HALS-3 | 0.9 | Xylene | EVA | 0.72 | 4.0 | O |
| Comp. Ex. 19 | — | — | Xylene | EVA | 0.74 | 1.5 | X |
| Comp. Ex. 20 | — | — | — | EVA | 0.17 | 2.0 | X |
| Example 21 | HALS-2 | 1.0 | Toluene | AST | 2.00 | 4.0 | O |
| Comp. Ex. 21 | — | — | Toluene | AST | 2.10 | 1.5 | X |
| Comp. Ex. 22 | — | — | — | AST | 0.17 | 2.5 | X |
| Example 22 | HALS-2 | 1.0 | Toluene | AST | 1.50 | 4.0 | O |
| Example 23 | HALS-2 | 1.0 | Toluene | AST | 2.20 | 4.0 | O |

TABLE 3-continued

| | | | Functional group-containing polyolefin etc. | | | | |
|---|---|---|---|---|---|---|---|
| Example 24 | HALS-1 | 1.5 | Xylene | AST | 1.25 | 4.0 | O |

*(Parts by weight/100 parts by weight of syntheitic resin component)
(Note 1)
IPP: Isotactic polypropylene
PER: Propylene-ethylene random copolymer
PBR: Propylene-butene-1 random copolymer
SEP: Styrene-isoprene block copolymer hydrogenated product
(Note 2)
UV-1: Methyl-3-[3-t-butyl-5-(2H-benzotriazol-2-yl)-4-hydroxyphenyl]propionate/polyethylene glycol condensate
UV-2: 2-(2'-hydroxy-3'-t-butyl-5'-methylphenyl)-5-chlorobenzo-triazole
(Note 3)
HALS-1: Bis(1,2,2,6,6-pentamethyl-4-piperidyl)sebacate
HALS-2: Bis(1,2,2,6,6-pentamethyl-4-piperidyl) 2-(3,5-di-t-butyl-4-hydroxybenzyl)-2-n-butyl malonate
HALS-3: (1,2,2,6,6-pentamethyl-4-piperidyl/tridecyl mixed)-1,2,3,4-butanetetracarboxylate
(Note 4)
AST: Acryl-styrene copolymer resin type aqueous emulsion
EVA: Ethylene-vinyl acetate copolymer resin type aqueous emulsion

What is claimed is:

1. An aqueous emulsion adhesive composition capable of adhering a molded article formed from a highly crystalline resin to another article which comprises a resin component comprising
   (i) an aqueous emulsion comprising 100 parts by weight of an adhesive synthetic resin resulting from emulsion polymerization of one or more vinyl monomers selected from acrylic acid, acrylic acid esters, methacrylic acid, methacrylic acid esters, styrene, α-methyl styrene, and vinyl acetate, said adhesive synthetic resin being present in said aqueous emulsion adhesive composition in a concentration of 10 to 65% by weight and
   (ii) a solution comprising an organic solvent and 0.05-40 parts by weight at least one of (a) a polyolefin containing 0.01-20% by weight of at least one functional group selected from the functional groups consisting of carboxylic anhydride group, carboxyl group, glycidyl group, hydroxyl group, amido group, and alkoxysilyl group, and (b) a hydrogenated block copolymer containing 0.01-20% by weight of at least one functional group selected from said functional groups, composed of at least one aromatic vinyl compound polymer block and at least one aliphatic diene polymer block.

2. The aqueous emulsion adhesive composition according to claim 1 in which the polyolefin and hydrogenated block copolymer composed of at least one aromatic vinyl compound polymer block and at least one aliphatic diene polymer block from which said at least one of (a) and (b) is derived is a polymer component having an intrinsic viscosity (measured at 135° C. in tetralin) of 0.1 dl/g-10 dl/g.

3. The aqueous emulsion adhesive composition according to claim 1 in which at least one of (a) the polyolefin containing the functional group and (b) the hydrogenated block copolymer having the functional group composed of at least one aromatic vinyl compound polymer block and at least one aliphatic diene polymer block contains up to 70% by weight of a chloro group in addition to said functional groups.

4. An aqueous emulsion adhesive composition which comprises a resin component comprising
   (i) an aqueous emulsion comprising 100 parts by weight of an adhesive synthetic resin resulting from emulsion polymerization of one or more vinyl monomers;
   (ii) a solution comprising an organic solvent and 0.05-40 parts by weight of at least one of (a) a polyolefin containing 0.01-20% by weight of at least one functional group selected from the functional groups consisting of carboxylic anhydride group, carboxyl group, glycidyl group, hydroxyl group, amido group, and alkoxysilyl group, or 0.01-70% by weight of the combination of a chloro group and at least one member selected from the group consisting of said functional groups, and (b) a hydrogenated block copolymer containing 0.01-70% by weight of at least one member selected from the group consisting of a chloro group and said functional groups, composed of at least one aromatic vinyl compound polymer block and at least one aliphatic diene polymer block; and
   (iii) 0.1-20 parts by weight of at least one photostabilizer selected from the group consisting of ultraviolet ray absorbers and hindered amine radical inhibitors based on 100 parts by weight of the total amount of (i) and (ii) above.

5. The aqueous emulsion adhesive composition according to claim 4 in which the adhesive synthetic resin contains at least one resin selected from the group consisting of acrylic resin, styrene resin and vinyl acetate resin.

6. The aqueous emulsion adhesive composition according to claim 4 in which the polyolefin and the hydrogenated block copolymer composed of at least one aromatic vinyl compound polymer block and at least one aliphatic diene polymer block form which said at least one of (a) and (b) is derived is a polymer component having an intrinsic viscosity (measured at 135° C. in tetralin) of 0.1 dl/g-10 dl/g.

7. An aqueous emulsion adhesive composition which comprises a resin component comprising
   (i) an aqueous emulsion comprising 100 parts by weight of an adhesive synthetic resin resulting from emulsion polymerization of one or more vinyl monomers;
   (ii) a solution comprising an organic solvent and 0.05-40 parts by weight of at least one of (a) a polyolefin containing 0.01-70% by weight of at least one functional group selected from the group consisting of carboxylic anhydride group, carboxyl group, glycidyl group, hydroxyl group, amido group, alkoxysilyl group, and a chloro group and (b) a hydrogenated block copolymer containing 0.01-70% by weight of at least one functional group selected from said group, composed of at least one aromatic vinyl compound polymer block and at least one aliphatic diene polymer block, and containing (c) 60% by weight or less, based on the weight of said at least one of (a) polyolefin and (b) a hydrogenated block copolymer, of a monomer capable of radical polymerization other than the members of said groups being grafted onto said at least one of polyolefin and said hydrogenated block copolymer; and (iii) 0.1–20 parts by weight of a photostabilizer based on 100 parts by weight of the total amount of (i) and (ii) above.

8. The aqueous emulsion adhesive composition according to claim 7 in which the photostabilizer is at least one member selected from the group consisting ultraviolet ray absorbers and hindered amine radical inhibitors.

9. The aqueous emulsion adhesive composition according to claim 5 wherein the adhesive synthetic resin includes at least one vinyl monomer selected from acrylic acid, acrylic acid esters, methacrylic acid, methacrylic acid esters, styrene, α-methyl styrene and vinyl acetate.

10. The aqueous emulsion adhesive composition according to claim 1 wherein said organic solvent is an aromatic hydrocarbon, chlorinated hydrocarbon or aliphatic hydrocarbon.

11. The aqueous emulsion adhesive composition according to claim 1 wherein said organic solvent is an aromatic hydrocarbon.

12. The aqueous emulsion adhesive composition according to claim 3 wherein said organic solvent is an aromatic hydrocarbon, chlorinated hydrocarbon or aliphatic hydrocarbon.

13. The aqueous emulsion adhesive composition according to claim 4 wherein said organic solvent is an aromatic hydrocarbon, chlorinated hydrocarbon or aliphatic hydrocarbon.

14. The aqueous emulsion adhesive composition according to claim 7 wherein said organic solvent is an aromatic hydrocarbon, chlorinated hydrocarbon or aliphatic hydrocarbon.

15. The aqueous emulsion adhesive composition according to claim 3 wherein said organic solvent is an aromatic hydrocarbon.

16. The aqueous emulsion adhesive composition according to claim 4 wherein said organic solvent is an aromatic hydrocarbon.

17. The aqueous emulsion adhesive composition according to claim 7 wherein said organic solvent is an aromatic hydrocarbon.

* * * * *

UNITED STATES PATENT AND TRADEMARK OFFICE
CERTIFICATE OF CORRECTION

PATENT NO.   : 5,319,016
DATED        : June 7, 1994
INVENTOR(S)  : Saito et al.

It is certified that error appears in the above-indentified patent and that said Letters Patent is hereby corrected as shown below:

Column 29, line 49, after "viscosity" insert --[η]--;

Column 30, line 46, after "viscosity" insert --[η]--.

Signed and Sealed this

Twenty-seventh Day of December, 1994

Attest:

BRUCE LEHMAN

*Attesting Officer*          *Commissioner of Patents and Trademarks*